June 3, 1941. G. C. KELLAHER 2,244,396
PIPE COUPLER
Filed June 25, 1938
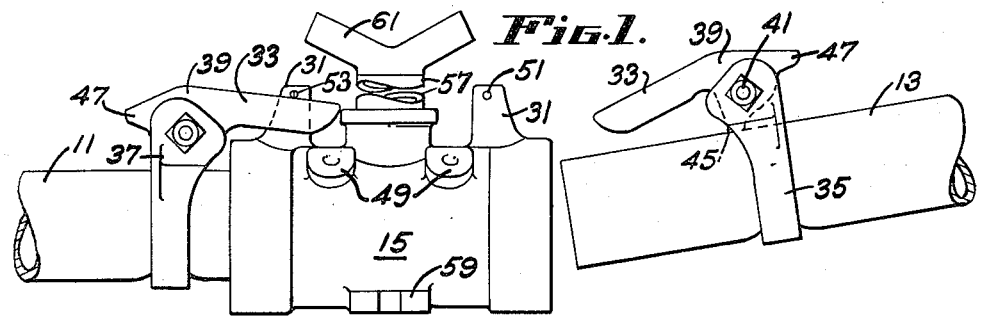
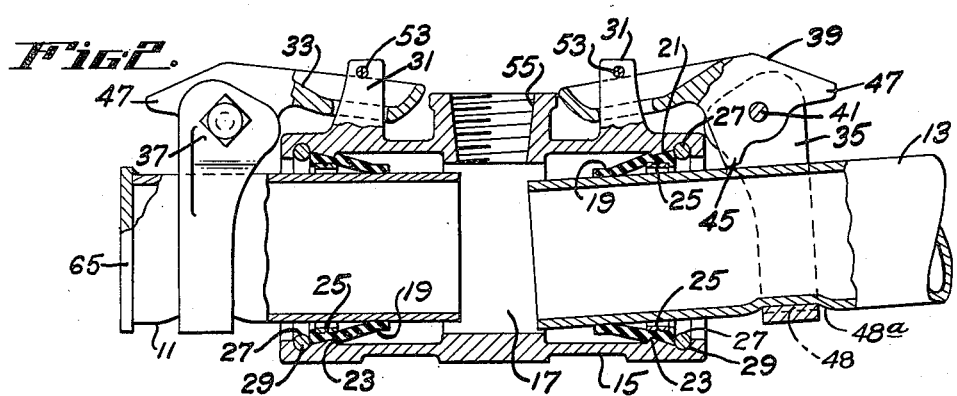
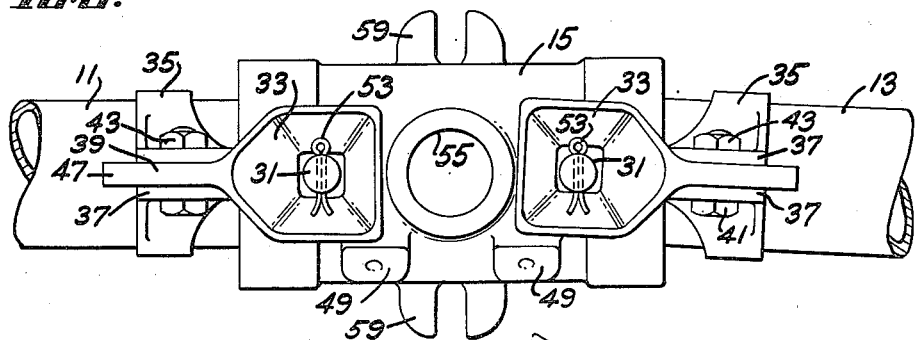
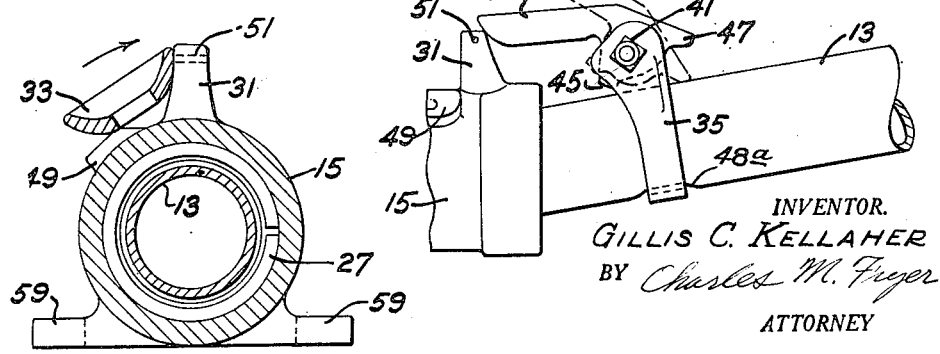
INVENTOR.
GILLIS C. KELLAHER
BY Charles M. Fryer
ATTORNEY Patented June 3, 1941

2,244,396

UNITED STATES PATENT OFFICE 2,244,396

PIPE COUPLER

Gillis C. Kellaher, Portland, Oreg., assignor to R. M. Wade & Co., Portland, Oreg., a corporation of Oregon Application June 25, 1938, Serial No. 215,821

6 Claims. (Cl. 285—193)

This invention relates to pipe couplers for making a liquidtight or gastight, that is a fluidtight connection.

In irrigating growing crops by spraying water upon them or otherwise, for example by running the water into small ditches adjacent the growing plants, it is often expedient to conduct the water from the source of supply thereof to the points of application through a portable knockdown system of pipes. This permits of applying the water to an area for an interval of time and then moving the system to another area for application of the water there, and the whole field can thus be irrigated, a part at a time. The commercial practicability of such a system depends to a great extent on the time and labor required to take the system apart after it has completed the irrigation of an area, move the parts to another area, and reassemble the system for operation there. The field surface is often uneven and irregular, and when the system is to be set up on such a surface it should be capable of conforming thereto without the use of special appliances, in order to save labor, time, and the cost of such special appliances. It is usually desirable that the sprinklers or other fluid-feeding devices used remain in position and do not fall over.

Objects of the invention are to provide a coupler of the type referred to which permits of coupling pipes by manipulating the pipe and without touching the coupler, or vice versa; which permits of making a watertight or fluidtight connection between pipes at an angle to each other; which permits of making a connection which has a sufficient degree of flexibility; which permits of easily and quickly making a connection between pipes; which may be automatically locked to a pipe; which may be automatically and positively locked to a pipe and which requires manual operation to unlock it when it is positively locked; which may carry a sprinkler or other fluid-feeding device so that such fluid may be distributed at desired points; which can maintain the sprinklers or other fluid-feeding devices in fixed positions; to provide a knock-down system which will distribute fluid in the desired manner at the desired points; and other objects will become apparent on reading this specification.

It will be apparent that the invention is not only applicable in the transmission and/or distribution of water, but of other liquids and fluids as well.

I have illustrated the preferred embodiment of my invention on the accompanying drawing which forms a part of this specification, like numerals designating like parts.

Fig. 1 on such drawing is a side elevation of my coupler with a pipe connected thereto and another pipe about to be connected thereto;

Fig. 2 is a vertical section through the coupler with two pipes connected thereto, one of said pipes being axially in alignment and one at an angle to the coupler;

Fig. 3 is a top plan view of the coupler with two pipes connected thereto, one of said pipes being axially in alignment and the other pipe being at an angle to the coupler, the angle being in a different plane than that shown on Fig. 2;

Fig. 4 is a side elevation of the locking means, showing one method of operating it; and Fig. 5 is a cross section of the locking means showing another method of operating it.

The pipes to be coupled together are designated 11 and 13. The coupling comprises a casing 15 which may be generally cylindrical in shape and which is hollow to form a chamber 17 open at both ends to permit the insertion of the pipes to be connected. The two ends are preferably constructed alike and I shall therefore describe the various parts at one end only. A truncated-cone-like gasket 19 of rubber or other suitable resilient, waterproof material is positioned within the casing at the opening, the smaller end thereof pointing inwardly. It is preferred that the larger end of the gasket be larger than and the smaller end thereof somewhat smaller than the pipe to be inserted therein, so that the pipe may be easily inserted into the gasket and a watertight or fluidtight connection between the pipe and the coupling may be made by merely pushing the pipe into the gasket. The gasket being so dimensioned that it will normally surround the pipe to make a fluidtight joint therewith, fluid pressure within the chamber 17 will press the gasket that much more firmly upon the pipe.

Means are provided to hold the gaskets in place, which may be of any suitable construction. For this purpose I prefer to provide an inwardly sloping annular shoulder 21 on the inner face of the chamber to form an annular step 23 adjacent each end of the chamber, against which the gaskets are tightly pressed by metal rings 25. The gaskets are thereby anchored in position, with sufficient play for the smaller part to make a fluidtight joint with the pipe. In order to hold the gaskets more firmly in position, rings 27 press the outer ends of the gaskets axially inwardly to compress the gasket material between the rings 25 and the annular shoulders and steps. The rings 27 are preferably of the split expansion type and fit into annular grooves 29 in the interior of the casing wall.

Connection between a pipe and a coupling may thus be made by moving the pipe axially of itself into an open end of the coupling. Such movement of the pipe may be axially of the coupling, but it is often more convenient to move it obliquely to the coupling, as shown on Figs. 1 to 4.

Means are provided to lock the pipe to the coupling and to prevent relative rotation thereof after they are locked together, by mere insertion of the pipe therein if desired, or if preferred, by turning the pipe after insertion. With this in view I provide means on the pipe and means on the coupling which co-operate with each other to form a latch-like locking means to hold the two in substantially fixed relation to each other, manual operation being necessary to open said latch-like means. This means includes a movably mounted latch element, and a latch holder or keeper element. One of these elements is mounted on one of the members to be connected and the other of these elements is mounted on the other of the members to be connected. I may also provide means to hold the latch-like locking means in locking position in order to prevent accidental unlatching. The preferred construction comprises a tapered projection 31 which may be cast integral with the casing 15, and a tiltable cup-like eye 33 having a hole to be automatically lifted upon striking the projection, and which is then adapted to fall automatically around the projection. A split collar 35 is attached to each pipe to be coupled, adjacent the end of each pipe but at such a distance therefrom as to leave sufficient length for insertion of the pipe end into the coupling. The ends of the collar project almost diametrically of the pipe to provide parallel spaced lugs 37. A bar 39 affixed to or integral with the eye 33 is mounted for swinging movement between the lugs 37 by passing a bolt 41 through aligned perforations in the lugs 37 and bar 39, and affixing the bolt in position with the customary nut 43. The bar 39 may thus be tilted and the eye moved up and down in an arcuate path. In order to prevent too great an up or down movement stop lugs 45, 47 are provided on the bar 39 to strike against the pipe and thereby to limit the movement. Means are provided to prevent rotation of the collar 35 on the pipe; and for this purpose the collar may be provided with a lug 48 which bends the pipe wall on being forced into it, to form an indented lug seat 48a. The lowermost position of the eye 33 is illustrated on Figs. 1, 2 and 3, the uppermost position thereof is illustrated in dotted lines on Fig. 4, and an intermediate position assumed during locking movement is illustrated in full lines on Fig. 4.

The co-acting surfaces of the projection 31 and of the eye 33 are oblique and so arranged that the eye can ride up on the projection and then drop down around it when the eye opening is over the projection on bringing them together, to lock the pipe to the coupling. Such automatic locking action occurs when the pipe is moved axially of itself with the eye in alignment with the projection. The eye then rides endwise up on the projection, the progressive action being shown at the right end of Fig. 1, the full line position on Fig. 4, and Fig. 2. A somewhat similar automatic locking action occurs when the pipe end has been inserted into the coupling with the eye out of alignment with the projection and the pipe is then turned. The eye then rides sidewise up on the projection as shown on Fig. 5, and automatically drops around it. Lugs 49 may or may not be provided to raise the eyes in their rotating movement preliminarily to their striking and being further raised by the projections. The outer surfaces of the eyes and of the projections may be curved instead of straight for easier functioning. For example, the surfaces of the projections may be slightly concave and the outer surfaces of the eyes may be slightly convex.

The eye may be positively held in position by perforating the projection at 51 and passing a cotter pin 53 therethrough over the eye after the eye is in position around the projection. This cotter pin is preferably used where the connection is to be permanent, and need not be used at points where disconnection is to be made after use of the assembled parts.

A threaded opening 55 may be provided to accommodate a connection or fixture 57, or such opening may be plugged if the connection or fixture is not desired. The threads in such opening 55 may, however, be omitted, if desired; and some other retention means may, if desired, be used. Feet 59 may be provided on the coupling for attaching it to a suitable support (not shown) when this is desired or to prevent the coupling from rolling when it is set on the ground. As appears on Fig. 3, the opening in the eye 33 is sufficiently large to permit it to drop easily and quickly around the projection 31, yet such opening is small enough to prevent any substantial amount of relative rotation between the projection and the eye with these parts in locked relationship. With the collar 35 prevented from rotating about the pipe, as described above, relative rotation between the coupling and the pipe is prevented.

The invention may be used for easily and quickly making a fluidtight connection in almost any situation; and it may be used for connecting together pipes positioned more or less irregularly to each other. It is thus well adapted as a portable system for sprinkling crops, where sections of the field are to be sprinkled consecutively each for a period of time, as referred to above. For this purpose sprinkler elements 61 may be connected to and supported by the connections 57. The sprinkler 61 or any other server of fluid that may be carried by the coupler cannot fall or tip over, because the casing 15 of the coupler is locked against rotation relatively to the pipe or pipes connected thereto, even if the feet 59 are omitted. The pipes are preferably of a length and weight easily carried from place to place and yet of sufficient length so that they can be inserted into and latched to the couplers to prevent substantial relative movement of any kind with respect thereto, by an erect workman without doing any more than manipulate the pipe, except for the insertion of the cotter pins if they are to be used to positively lock the latch-like locking means against accidental unlatching.

Water may thus be distributed by the use of my invention at any desired points by sprinkling, by having it flow out of the openings 55, or in any other desired manner. All that is necessary is to have my couplers at the desired points. The openings 55 may be plugged at those points where there is a coupler if no distribution of water is desired there.

A pipe 11 or 13 may be closed in order to end the water conducting conduit, and for this purpose the closed pipe is preferably only long enough to project slightly beyond the casing. It is interchangeable with an open pipe, and is used wherever the water main is to end. This modification is illustrated at the left of Fig. 2, a disc 65 being connected to the end of the short pipe 11 in any suitable fluidtight manner.

The term "pipe" as used in the claims is intended to include not only pipes open throughout, but also those which are closed. The casing 15 may also be considered to be pipe, so that my novel connecting and locking means may be used for connecting together pipes, one of which has an end that can be inserted into the end of the other. The term "pipe" as used in the claims, is intended, where applicable, to include this also.

I have referred to certain details in order to describe and illustrate my invention, but these may be varied without departing from the spirit of the invention.

I claim:

1. In a fluid conduit coupling device for conduit members, means for securing the members in flexible coupled relation in and out of axial alignment including a latch element movably mounted on one of said members and a keeper element mounted on the other member, said elements having coacting latch-operating side faces extending longitudinally of the coupled portions of said conduits and at least one of said faces being a cam surface, whereby, upon rotation of one conduit member relative to the other conduit member after coupling engagement of the members, the latch element will be cam-retracted and then moved into latching engagement with said other element.

2. A self-latching fluid conduit coupling device as set forth in claim 1 in which the latch element is formed with a cam surface.

3. A self-latching fluid conduit coupling device as set forth in claim 1 in which the latch element is provided with a cam portion having keeper-engaging faces whereby the latch may be engaged with the keeper by relative longitudinal movement of the conduit members or by relative rotation thereof in either direction.

4. In a fluid conduit coupling device for conduit members, means for securing the members in flexible coupled relation in or out of axial alignment and for preventing substantial relative rotation between the members, including a latch element movably mounted on one of said members and a keeper element mounted on the other of said members, said elements having coacting latch-operating faces at least one of which faces is a cam surface, whereby, upon movement of one conduit member relatively to the other conduit member the latch element will be cam-retracted and then move into latching engagement with said keeper element, said latch and keeper elements when in latching engagement serving to prevent substantial relative rotation of said members.

5. In a fluid conduit coupling device for conduit members, means for securing the members in flexible coupled relation in or out of axial alignment and for preventing substantial relative rotation between the members, including a latch element movably mounted on one of said members and a keeper element mounted on the other of said members, said elements having coacting latch-operating faces at least one of which faces is a cam surface, whereby, upon movement of one conduit member relatively to the other conduit member the latch element will be cam-retracted and then move into latching engagement with said keeper element, one of said elements comprising a projection and the other of said elements being formed with an aperture adapted to receive said projection whereby said elements will interlock to prevent substantial relative rotation of said conduit members.

6. Coupling mechanism for making a slightly flexible and substantially liquid-tight connection between a coupler carrying a distributor for liquid and a pipe normally held against rotation and supplying said liquid; comprising a movably mounted latch element and a keeper element carried one by said coupler and the other by said pipe, said elements having latch-operating faces at least one of which faces is a cam surface to cause, on relative movement of said latch and keeper elements to each other, said latch element automatically to be cam-retracted and then to move into latching engagement with said keeper element; said coupler carrying said distributor normally in a raised, angular position with respect to said pipe when coupled to said pipe; said coupler and said pipe carrying means including said latch and keeper elements to prevent separation of said pipe and said coupler and to prevent substantial relative rotation thereof to maintain said connection and to maintain said distributor in said normal, raised, angular position.

GILLIS C. KELLAHER.